Inventor
JAMES J. ANSELL
KENNETH G. PAYNE

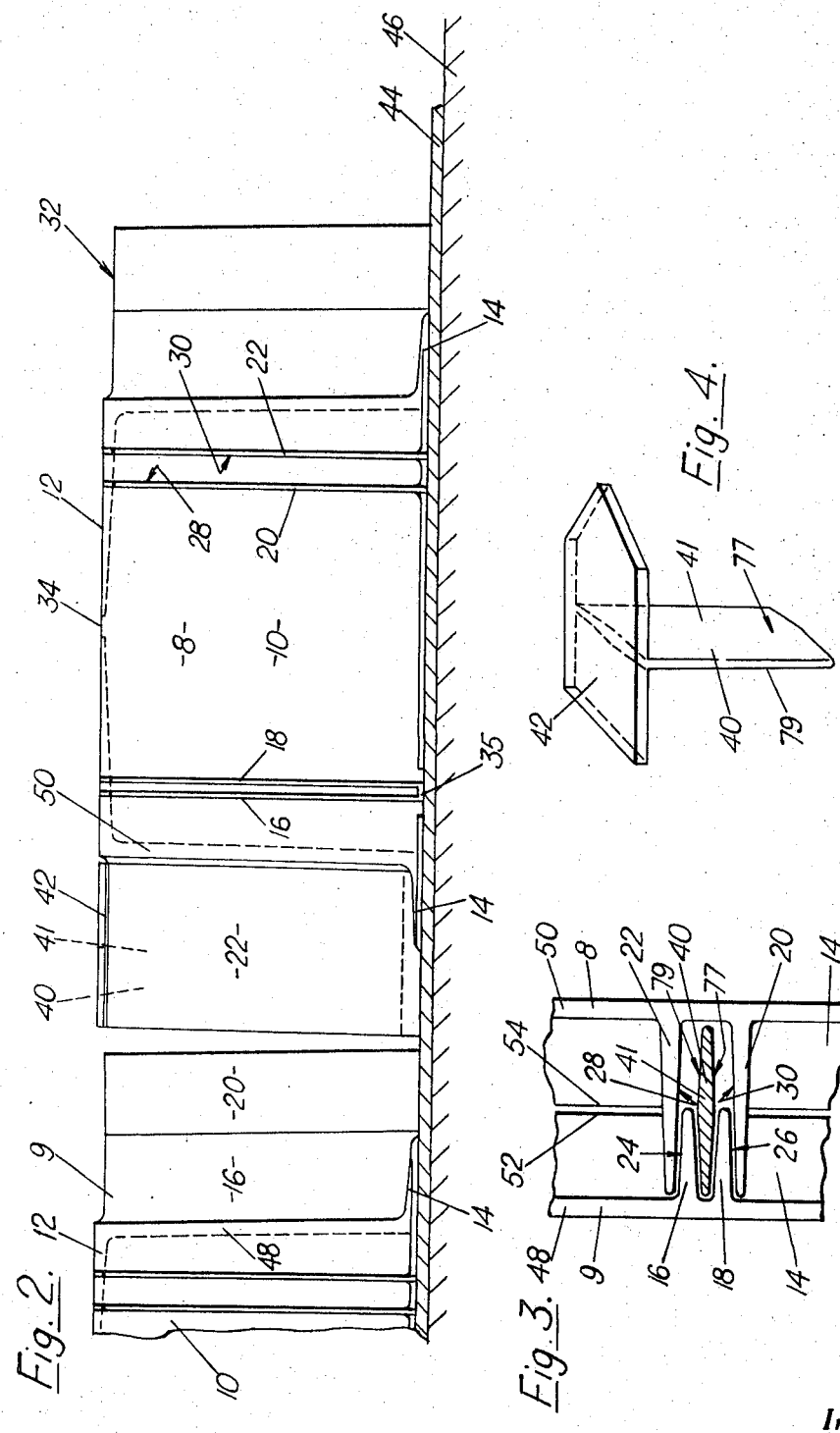

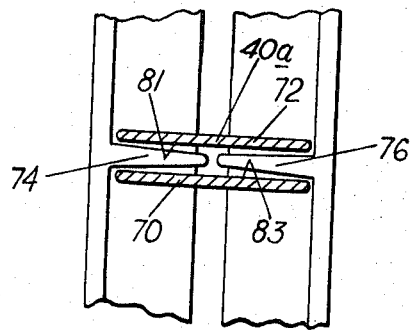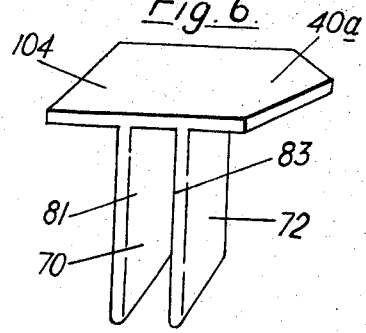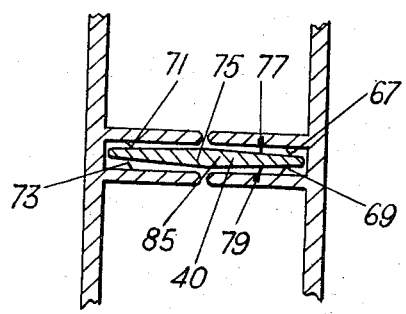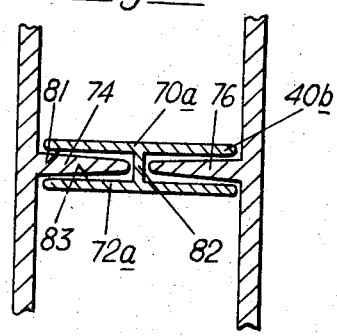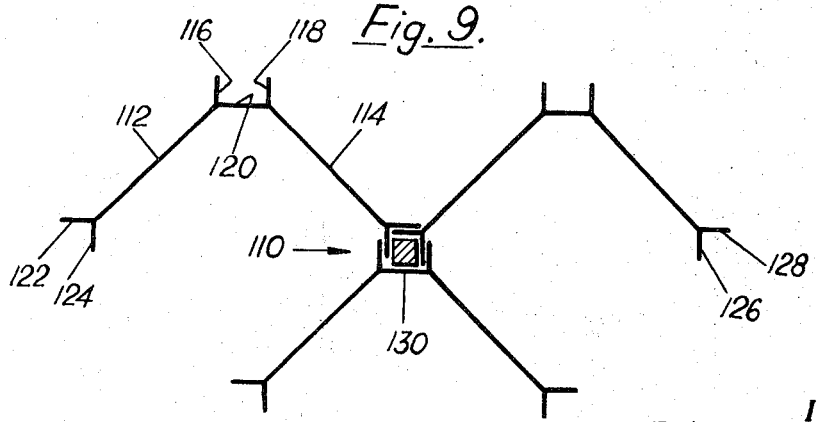

United States Patent Office 3,837,962
Patented Sept. 24, 1974

3,837,962
METHOD OF ASSEMBLING HONEYCOMB STRUCTURES
James Joseph Ansell and Kenneth Gordon Payne, Bristol, England, assignors to Rolls Royce (Composite Materials) Limited, Bristol, England
Filed May 9, 1968, Ser. No. 734,842
Claims priority, application Great Britain, May 11, 1967, 22,001/67
Int. Cl. B32b 31/12
U.S. Cl. 156—293     5 Claims

ABSTRACT OF THE DISCLOSURE

A lightweight, load-bearing honeycomb structure is formed by juxtaposing on a base pair of units each having projecting webs which overlap each other, applying within and between the overlapped webs a predetermined quantity of plastic adhesive, and inserting within the space a connecting member having a stem which presents bonding surfaces opposite bonding surfaces of the units to a degree sufficient to force the adhesive in the space between all abutting bonding surfaces of the interconnecting member and the units.

---

This invention concerns methods of assembling units to form structures which have the same general purpose as those described in the Pat. No. 3,391,511. Structures described in that patent consist of units of plastics material mounted between skins of metal or plastics material to form rigid strong honeycomb structures. In a central part of any such structure, each unit is surrounded by and bonded to adjacent units. By means of the present invention, load-bearing honeycomb structures are formed which are improvements and modifications of the structures described in those specifications.

The type of units which are used in those and this invention are of a plastics material and comprise a wall or walls which have or can receive on them a flange or flanges, or an end wall or walls, so that the units can be laid adjacent to one another between two skins of, for example, metal or plastics material. The walls present, or have terminal parts which present, or have webs which present, surfaces for bonding (termed "bonding surfaces") as a means of connection between adjacent units, the connection being made by bonding together the bonding surfaces of adjacent units. This invention relates to units of this type and also to such units which have been modified so that an intermediate member is employed to interconnect them. In the claims of this application the units as described in this paragraph are covered by the term "units of the type described."

The bonding surfaces extend generally outwards of the unit, and in use they lie generally adjacent to and parallel to corresponding bonding surfaces on juxtaposed units. A plane in which adjacent corresponding bonding surfaces lie is perpendicular to an axis about which the units having those surfaces might be required to tilt relatively to one another to provide single curvature. If double curvature might be required there are at least two planes in which adjacent corresponding bonding surfaces lie, and the planes are preferably at a substantial angle, for example a right angle. In use those corresponding surfaces are bonded together so that the units form with the skins a load-bearing honeycomb structure.

The precise amount of double curvature which might be achieved with the units is dependent on the arrangement of the bonding surfaces, and numerous arrangements are described in the specifications numbered above. Clearly since the surfaces are in two planes, sliding in one plane must to some degree cause the surfaces in the other plane to lie out of parallel. It is the amount of this out of parallel which is tolerable which determines what degree of double curvature is possible.

According to the present invention, a method of joining together two units of the type described, comprises laying a first unit on a base, laying a second unit on the base, with the corresponding bonding surfaces lying suitably adjacent to one another (as defined herein), and in the relative position required of the two units in the assembled structure, taking a member which has one or more stems presenting opposed bonding surfaces, applying a quantity of adhesive to a space which lies either between the bonding surfaces on the member, then applying the member to the suitably adjacent bonding surfaces on the units so that the adhesive flows to bond together the bonding surfaces.

Some units and members which can be joined by methods according to this invention are described below with reference to the accompanying drawings in which:

FIG. 2 is an elevation of what is seen in FIG. 1 when looking from the head of the figure to the foot;

FIG. 3 is a fragmentary sectioned underneath plan view of the adjacent parts of two assembled units and a member;

FIG. 4 is a perspective view of the member;

FIG. 5 is a view corresponding to FIG. 3 but of a different arrangement;

FIG. 6 is a perspective view of the member seen in FIG. 5;

FIG. 7 is a view similar to FIG. 3 but of a further arrangement;

FIG. 8 is a view similar to FIG. 5 but showing a further form of member which could be used; and FIG. 9 is a diagrammatic sectioned plan of three intersecting units and a member.

Figure 1:
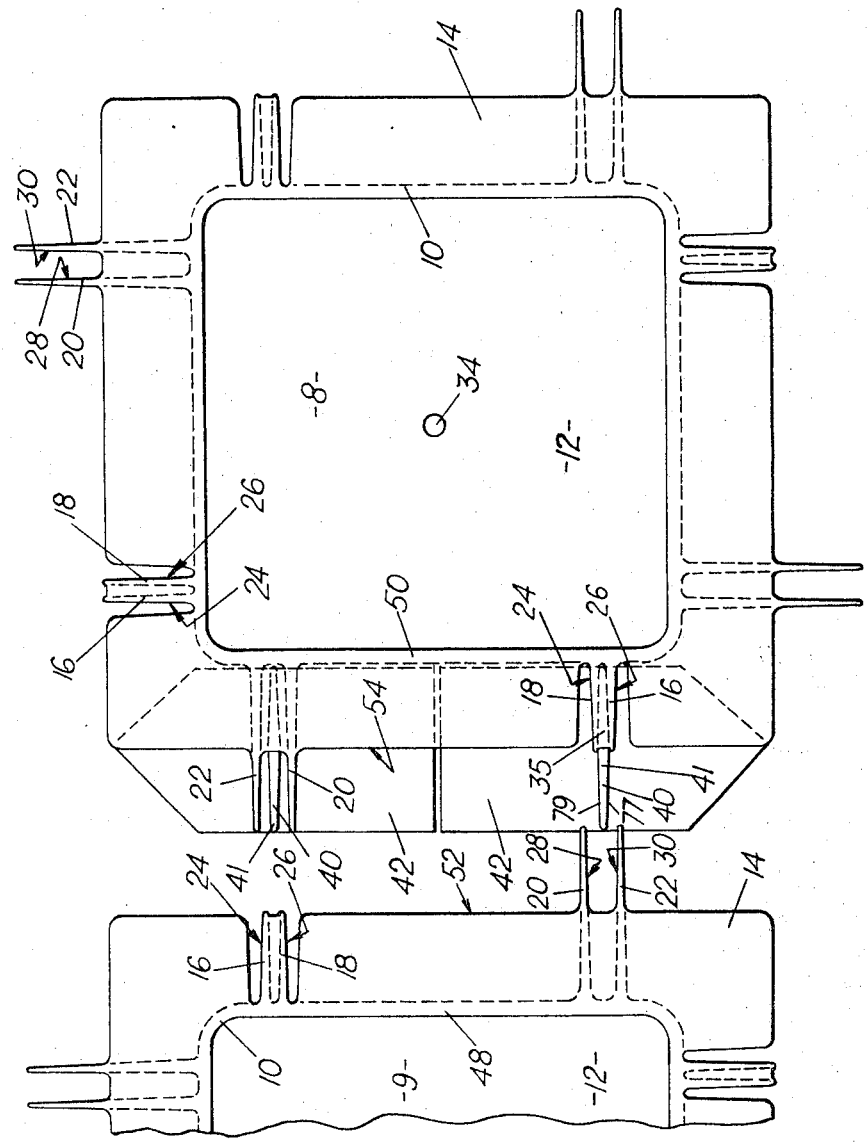
FIG. 1 is an exploded underneath plan view of a unit, a member, and the adjacent side of a further unit.

Each of the units seen in FIGS. 1 and 2 is generally square and hollow, having a peripheral wall 10 and an end surface 12. The end of the unit opposite to the end surface 12 has an outwardly directed flange 14 around its periphery. Each of the outer faces of the four walls which constitute the peripheral wall 10 has four outwardly projecting webs. Two of the webs shown as 16 and 18 extend from the wall 10 to the outer edge of the flange 14. The remaining two webs, seen as 20 and 22, project from the wall 10 but extend outwards from the wall by a distance approximately twice that of the webs 16 and 18. The distance between the outer faces 24 and 26 of the respective webs 16 and 18 is slightly less than the distance between the inner faces 28 and 30 of the respective webs 20 and 22. As is best seen in FIG. 2, the webs do not extend the entire height of the unit but lie slightly below the end surface 12. The top of the flange is seen as 32 in FIG. 2. The end wall 12 has a hole 34 passing through it. The webs 16 and 18 are interconnected at the bottom by an integral short member 35 which is a prolongation of the flange 14. There are gaps in the flange 14 immediately outwards of the webs 16 and 18; no such gaps are present in the vicinity of the webs 28 and 30. As is clear from FIG. 1, each of the four walls of the peripheral wall 10 presents an identical configuration of webs, and the different pairs of webs form an alternating pattern around the peripheral wall.

To enable two of these units to be assembled together as a stage in forming a honeycomb structure, the members 40 are used. One is seen in perspective in FIG. 4; it is seen to have a stem 41 and a cap 42.

The member 40 is seen to have a T form in front elevation, the stem 41 has opposed surfaces 77, 79 which can be tapered from the head to the foot for reasons described below. As seen best in FIG. 3, the width of the surfaces 77 and 79 of the stem 41 are substantially equal to that of the webs 20 and 22. The cap 42 has the shape of a rectangle having an edge common with the hypotenuse of a 45° right-angle triangle. The reasons for this are described below.

An assembling operation of the units with the members is as follows.

A bottom skin 44 is laid on a supporting surface 46. The skin 44 then acts as a base or supporting surface for the units to be laid on. The skin 44 will be an outer skin of the assembled honeycomb structure, and can be of any of the materials described in Pat. No. 3,391,511, for example of resin reinforced with any one of a variety of fibres, or of metal etc. The skin 44 is omitted from FIG. 1 for clarity; it would be in the plane of the paper.

A first unit 8 is then placed on the skin 44 with its flange 14 facing downwards on the skin; the end surface 12 of the unit is horizontal and uppermost; the hole 34 permits air to escape.

A second unit 9 identical to the unit 8 is then placed to lie adjacent to the unit 8, flange downwards, and with its nearest wall, designated as 48, parallel to the nearest wall, designated as 50 of the unit 8. Because of the arrangement of the webs, the webs 16 and 18 on the unit 9 are received between the webs 20 and 22 of the unit 8, and the converse is true of the further pairs of webs which are also on the walls 48 and 50. The arrangement of the first webs is seen in section in FIG. 3. The edge 52 of the flange of the cell 9 abuts the edge 54 of the flange 14 of the cell 8. For each two pairs of webs, a measured quantity of a cement is then injected into the space lying generally between the webs 20 and 22. The cement flows to lie between the opposed faces of the webs 16 and 22, and the webs 18 and 20. The stem 41 of one of the members 40 is then pressed downwards. The quantity of the cement injected is just sufficient to entirely fill that cavity between the stem 41 and the inner free parts of the webs 20 and 22, besides providing the bonding between all abutting surfaces. It becomes rigidly consolidated in the cavity and bonds to walls which are free, that is to say walls which are not abutting other walls. When the stem 41 has been pushed fully home between the webs, the upper surface of the cap 42 lies flush with the upper surface of the end surface 12. This is because the thickness of the cap 42 is equal to the distance by which the edge 32 of the webs lies below the upper surface of the end wall 12. A further member is applied to the other interconnecting pairs of webs, as is seen in FIG. 1.

As is evident from FIG. 1 the members are applied to the webs so that their caps 42 have only neat narrow gaps between each other, and between themselves and the end walls 12. They present right-angled mitres at the corners of the unit 8. Clearly, when further identical caps 42 are in position around the periphery of the units 8, 9 and all others not shown, a neat and substantially covered peripheral surface is presented which is in the plane of the upper surface of the end wall 12. If a second skin (not shown) is laid on top of the assembled units with the caps in place, there is presented to that skin a continuous and regular surface.

It is not necessary to have a separate cap 42 for each stem 41; there can be any number of stems on a common cap. This is dictated purely by convenience and any curvature that may be required.

The member which is seen in perspective in FIG. 6, and in section in FIG. 5 has two parallel planar stems 70 and 72. It can be used to interconnect two further units, the detailed form of which is not important; FIG. 5 merely shows fragments of the associated parts of two units.

In the arrangement seen in FIG. 5, each unit presents two surfaces for bonding, the two being opposite sides of the single webs 74 and 76. There can of course be further single webs along the same wall of the unit. The method of assembly is the same as described above except that the cement is applied not directly to the units, but to the space defined between the parallel inwardly facing surfaces 81 and 83 of the respective stems 70 and 72 of the member, before the member is applied to the adjacent webs seen in FIG. 5. So that the cement does not drop from the space as the member is held over the units, a thixotropic cement has to be used. In the assembling operation, the units are laid so that their webs lie in line, then the cement is injected between the stems 70 and 72 of the member and the stems pushed down the opposite sides of the webs 74 and 76.

It is useful to arrange for opposed bonding surfaces on the member and on the units, to taper relatively to one another in a direction to cause the adhesive to flow most easily over the areas of those surfaces as the member is pressed down. For example in the arrangement seen in FIG. 5 the inwardly facing surfaces of the stems 70 and 72 are parallel and each of the webs converges to its remote end. Clearly, wherever the adhesive initially lies in the space between the stems, it will flow most easily around the webs and over their surfaces before leaking from the spaces along the outer sides of the stems.

FIG. 8 shows in cross-section a modified form of the member seen in FIG. 5. The walls 70a and 72a are joined by a bridge member 82. This has the advantage that it can be applied to the terminal parts of two walls, when they lie as do the webs 74 and 76 in FIG. 5. The bridge locates between the very ends of the walls, and retains the position of the member.

In the arrangement seen in FIG. 7 each unit presents a pair of webs, the inwardly facing surfaces 67, 69 and 71, 73 of the respective pairs constituting bonding surfaces. In joining the two units it is necessary to use an intermediate member which has a stem 75, one face 77 of which bonds to the bonding surfaces 67 and 71 and the other face 79 with the surfaces 69 and 73.

The faces 77 and 79 which have the width of the stem are substantially twice as wide as any of the bonding surfaces 67, 69, 71 or 73. The four surfaces of the webs are substantially parallel, and those of the stem are generally convex, so that the control part 85 of the stem is the thickest part thereof, as is clear from FIG. 7. By this arrangement, the adhesive lying in the space between the webs flows most easily over the bonding surfaces, rather than being expelled from the space, as the stem is being pushed down the space. To avoid forcing the adhesive out of the gap between the ends of the webs, the stem can also be tapered along its length, as is the stem 41 seen in FIG. 4.

In the arrangement seen in FIG. 9 the bonding surfaces are not on the sides of webs which extend outwards from the peripheral wall of cellular shaped units, as seen in FIGS. 1, 2 and 3. The surfaces for bonding are presented by the terminal parts of walls. FIG. 9 shows in section how three identical units meet at a joint 110. Each unit comprises a generally V-shaped wall defined by the sides 112 and 114, and at the angle between them there are three walls which present bonding surfaces 116, 118 and 120. The terminal parts of the walls 112 and 114 present pairs of bonding surfaces 122, 124 and 126, 128. (For convenience, these numerals are applied to surfaces other than those which actually comprise the joint 110, but because the units are identical it is to be understood that the numerals in the description refer to the corresponding component parts of the joint 110.)

When three units are brought together at a joint 110, a substantially rectangular cavity is defined between the seven walls numbered above. Three pairs of the walls overlap and can slide whilst maintaining contact for bonding. This flexibility permits double curvature to be built into the structure during assembly. After the cavity has been defined a measured quantity of cement is injected and a stem 130 of a member is then pressed home between the walls and forces the overlapping walls into tighter contact. The peripheral wall of the member 130 presents the "surfaces for bonding" which are presented by the faces of the stem 41 in the T-shaped member described first above. When the stem is rectangular in section, those surfaces of it which are opposite are opposite sides of the rectangle, but it is to be understood that the term can be applied to a stem has for example, a circular cross-sectional form, in which case the opposed surfaces are the diametrically opposed elements of the surface. A cap 51 for the stem 130 is not shown because whether a cap is present or not, and its shape if present, are both dictated by considerations which are not directly associated with this invention.

In relation to all the structures formed by methods according to this invention the function of the caps is firstly to support an overlying skin if such a skin is required and if there would otherwise be a gap into which the skin might collapse undesirably. Secondly as the cap bonds to the skin and is integrally associated with the stem or stems, it can be used for the transmission of stress through the structure. In consequence, the form of the cap, and whether or not it is present, is dictated by those requirements.

Where a continuous surface for supporting the skin is not necessary, one can dispense with the cap 42 and only use the stem 40 to complete the bond and the stress distribution between the webs of adjacent units, the transmission of the stress from the upper skin, not shown, to the peripheral walls 10 of the units being through the bond between the upper skin and the surface of the end wall 12.

Alternatively one could have no end surfaces 12, but keep or even extend the area of the caps 42, the transmission of the stress from the upper skin to the walls 10 of the unit being then through the bond between the skin and the cap 42, and through the stem 40 to the webs.

The term "web" has been used through this specification to denote the component which presents a surface or surfaces for bonding. It must be recognised that such a surface or surfaces can obviously be presented by the edge portions of the terminal parts of a wall.

By the term "suitably adjacent" as applied to the surfaces for bonding which the different webs or the terminal parts of the walls present, is meant that the bonding surfaces are in an attitude for co-operation with the bonding surfaces which are presented by either or both of the adjacent unit and the member. This means, in relation to the embodiments seen in FIGS. 1, 2 and 3, that there is an interlocking of the webs with perhaps a slight gap between them. In relation to what is seen in FIGS. 5 and 8 it means that the webs 100 and 102 are substantially in line so that the member can be applied simultaneously to both of them. In FIG. 7, it means that the four webs lie to define a closed rectangular space to receive the adhesive.

One advantage of the described construction over what is disclosed in our patent and patent applications numbered above is that the caps and the continuous surface of the end walls 12 provide a superior resistance to the effects of shock loading. They do this by reducing the concentration of stress on a small area at the top of the webs, and distributing the stress over a larger area, thereby reducing any tendency for the skin to peel away from the corner of the unit. The bond area between the second skin and the units is also increased by the presence of the caps, and this clearly further improves the shock performance.

Another advantage is that the units can be assembled dry on the lower skin, whereas it was necessary before to apply the cement to the webs before laying the units on the supporting surface or the skin. It is therefore a cleaner method of assembly and removes the need to clean excess resin before laying the top skin. As the precise quantity of cement needed to be applied can be accurately distributed at the assembly stage, the strength characteristics of a honeycomb structure assembled from mass produced units can be more accurately controlled.

Compared to the earlier constructions, one can by means of the present invention assemble structures having a greater amount of curvature than with the earlier units, even though webs of the same width are used. The same shear strength is maintained between the webs.

It is not necessary that the webs should project at right angles from the peripheral wall of the unit as seen in FIG. 1. The webs can be at 45°, for example, to the walls of a rectangular cell unit. All the webs on a unit can be arranged to be parallel to each other, but at 45° to the rectangular peripheral walls, or the webs on adjacent faces can be perpendicular. The latter does have the disadvantage that a unit which has to be applied to two diagonally adjacent units must be slid vertically down the webs of both of them, which may not be convenient when surrounding structure is present, but does give strength which varies little with the direction of the stress.

We claim:

1. A method of building a lightweight, load-bearing honeycomb structure, the method comprising the steps of laying on a base a first unit, which is of plastic material, has a wall extending perpendicularly to said base, and has planar bonding surfaces rigidly associated with the said wall and lying in perpendicular planes; laying on said base a second unit which is identical to said first unit, positioning said second unit in juxtaposed relationship to said first unit, whereby bonding surfaces on said first unit lie parallel to and in mutually overlapping cooperative association with bonding surfaces on said second unit and leave a space within said bonding surfaces; said method further comprising the steps of applying a predetermined quantity of adhesive to said space, and thereafter applying an interconnecting member comprising at least one stem which presents bonding surfaces opposite bonding surfaces of said units into said space, to a degree sufficient to force said adhesive in said space between all abutting bonding surfaces of said interconnecting member and said first and second units.

2. A method as claimed in claim 1, wherein said base is curved in at least one plane, and said bonding surfaces are disposed on said respective cell units such that all abutting bonding surfaces can slide over one another during the laying operations to lie in parallel engagement with one another.

3. A method as claimed in claim 1, which includes adhesively securing a skin to all of the units on the opposite side thereof from the base.

4. A method as claim 1, in which each unit has spaced webs extending therefrom, surfaces of which constitute said planar bonding surfaces.

5. A method as claimed in claim 4, in which two webs on a first unit are spaced further than two webs on a second unit, in which such positioning includes inserting the webs on the second unit between the webs on the first unit, and in which the applying of the inter-connecting member includes inserting the stem between the webs of the second unit.

References Cited

UNITED STATES PATENTS 3,093,847    6/1963    Strecker _____ 9—6
3,391,511    7/1968    Harris et al. _____ 52—430

BENJAMIN R. PADGETT, Primary Examiner

P. A. NELSON, Assistant Examiner

U.S. Cl. X.R.

244—124